Patented Sept. 23, 1947

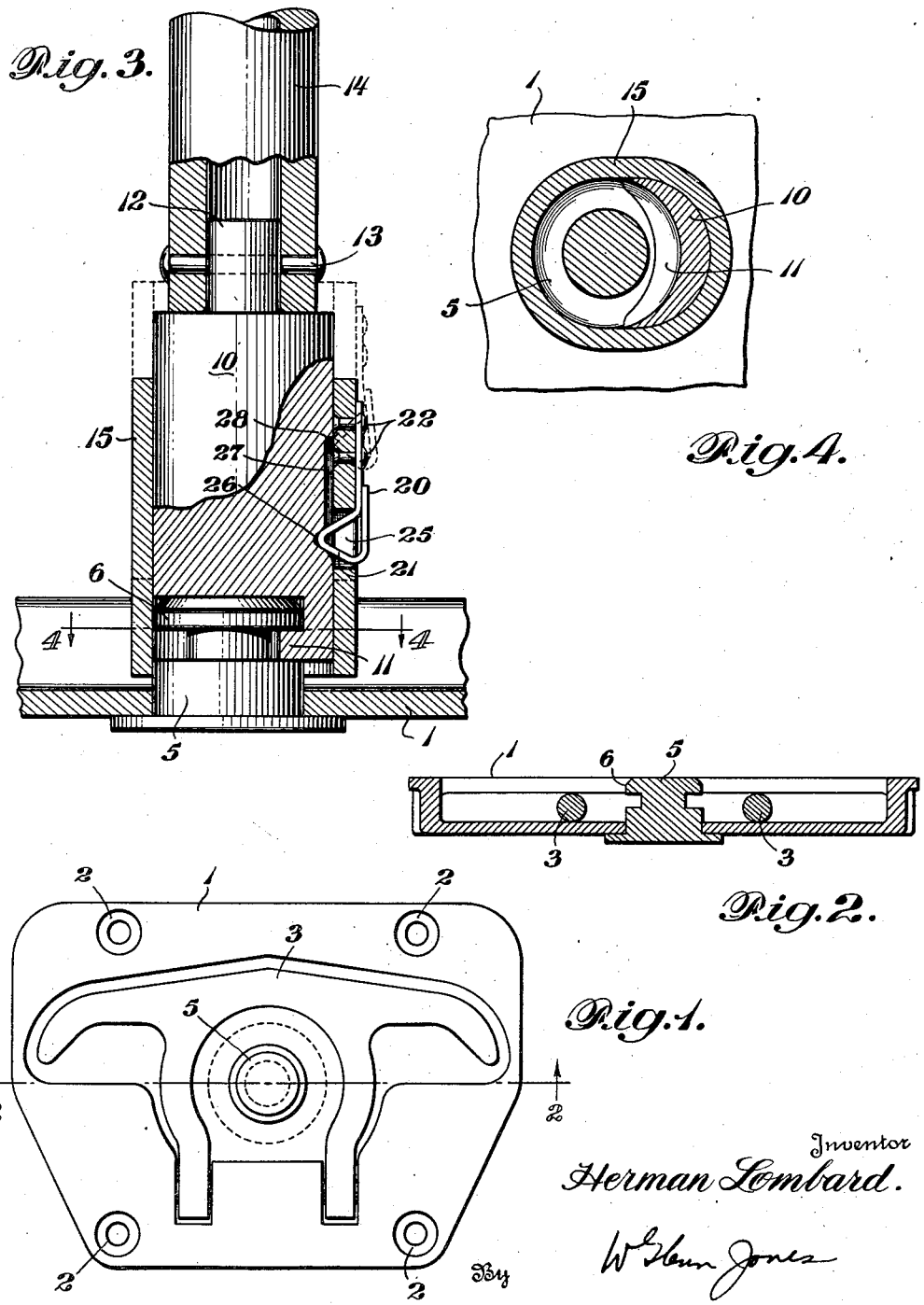

2,427,681

UNITED STATES PATENT OFFICE 2,427,681

CONNECTOR FOR RODS, STANCHIONS, AND THE LIKE

Herman Lombard, United States Navy

Application May 13, 1944, Serial No. 535,561

6 Claims. (Cl. 287—104)

(Granted under the act of March 3, 1883, as amended April 30, 1928; 370 O. G. 757)

This invention relates, in general, to a quickly attachable and detachable type of connector for rods, stanchions, and the like, and deals, more particularly, with a device of this kind that provides a rigid but readily removable mounting for objects having rod-like supports such as chairs, litters, etc., which are adapted to be installed interchangeably in transport airplanes and other vehicles.

A primary object of the invention is to provide a connecting device of this character which is of a simplified, unitary construction and designed to be operated easily and quickly in the mounting or removal of an object in an installation.

Another object of the invention is to provide a connector of the kind described which is positively locked in connected position in a manner whereby accidental or unintended removal or displacement of the connector is prevented.

A further object of the invention is for the provision of such a connector which is sturdy, reliable and comparatively inexpensive in that it requires only a minimum number of parts and relatively few operations in the manufacture thereof.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawings, means for carrying the invention into practical effect, without limiting the improvements in their useful application to the particular construction and arrangement which, for the purpose of explanation, have been made the subject of illustration.

In the accompanying drawings:

Figure 1 is a plan view of a standard type of tie-down fitting with which the present invention is used;

Figure 2 is a sectional view of Figure 1 taken along line 2—2, looking in the direction of the arrows;

Figure 3 is a vertical sectional view of the connecting device of the present invention showing the device in attached position; and, Figure 4 is a sectional view of Figure 3 taken along line 4—4, looking in the direction of the arrows.

Referring now, more particularly, to the drawings, Figures 1 and 2 illustrate a standard type of tie-down fitting with which the connector of the present invention is used. Such a tie-down fitting comprises a flanged plate 1 provided with apertures 2 for the passage of screws by which the fitting is secured flush with the deck or flooring of a vehicle. The plate 1 carries a pivoted ring or grapple member 3 for rope securing purposes and a centrally located button or stud member 5 to which may be connected a rod member, or the like. Tie-down fittings of this character are designed to be mounted flush with the flooring of a cargo carrier so that in the loading operation heavy packing cases may slide over the floor without interference. In the case of airplane transports which are used for carrying cargo or passengers, the tie-down fittings are so spaced as to be adapted for removably mounting chair legs to the studs 5 and for mounting the stanchions supporting sleeping berths or litters for carrying sick or wounded.

Figures 1 and 2 illustrate only one form of tie-down fitting with which the connector of the present invention may be used, it being understood that such fittings include the button or stud 5 in a standard design even though the ring or grapple 3 may be different in design or location on the plate 1.

Figure 3 shows a preferred embodiment of the invention in which the connector comprises a body or post 10 carrying at one end a foot or hook portion 11 designed to engage snugly any portion of the laterally projecting flange 6 forming the head of the stud 5. Preferably said hook is integrally formed on the post 10 by an undercut recess conforming generally to the contour of the flange 6 of the stud-head and otherwise defining an arcuate tongue which is snugly received in the peripheral slot in the stud below said flange 6, with the adjacent face of the body 10 bearing on the top of stud 5 so as to rigidify the connection.

A reduced portion 12 at the other end of the body 10 is designed to be received in the bore of a chair leg 14, litter stanchion or the like and secured in place as by a cross-pin 13. The connector body 10 may be of circular cross-section or oval cross-section, as shown, to approximate generally the combined cross-sectional area of the stud-head 6 and adjacent hook portion, as along section line 4—4, Figure 3.

A sleeve 15 having a bore of substantially corresponding cross-sectional area is telescoped over the body 10 and is designed for movement axially of said body from the locked position of the connector with the stud 5 to a position in which the connector is applied to or removed from said stud. In the latter respect, the sleeve 15 is moved upwardly on the connector body to expose the hook 11 for ready attachment or detachment to the stud 5. In the locked position of the connector, the hook 11 is engaged with the stud 5 and the sleeve moved downwardly to encompass the stud-head 6 and the hook 11, substantially as shown in Figure 3. In this position, the sleeve engages the periphery of the stud-head to prevent any movement of the connector body in the direction of disengagement of the hook 11 from said stud. The rigidity of the connection thus provided is enhanced by the arrangement in which the lower end face of the body 10 adjacent the hook defines a relatively large bearing surface which bears evenly on the top surface of the stud 5 while the lower end of the sleeve 15 engages the side of the stud below the slot to minimize the possibility of lateral displacement of the connector in locked position.

Preferably a spring catch or equivalent snap fastening means 20 is provided to hold the sleeve 15 upwardly retracted on the connector body 10 to facilitate attachment or detachment of the hook from the stud, or, to retain the sleeve in locked relation to the stud to prevent any accidental displacement of the sleeve which would permit an undesired detachment of the hook from the stud.

As an example, such a spring catch or snap retaining means is shown provided by a strip of spring metal bent to define a detent 21 at the end of a spring arm which is attached to the sleeve 15 in any suitable manner, as by rivets 22. The detent 21 projects through an aperture 25 in the sleeve and seats in a recess 26 in the body 10 to retain the sleeve 15 in the locking position of the connector with the stud 5. A groove 27 extending from the recess 26 defines a shoulder 28 at a point removed from said recess. When the sleeve is pushed upwardly to permit attachment or detachment of the connector from the stud 5, the detent 21 slides in said groove 27 and abuts said shoulder 28 to limit further movement of the sleeve. The spring catch 20 resiliently engages the connector body 10 adjacent the shoulder 28 to maintain the sleeve in upwardly retracted position, thereby facilitating the application of the hook 11 to the stud 5 in a subsequent attaching operation.

In use, with the sleeve 15 in such upwardly retracted position, the connector is easily and quickly applied to engage the hook 11 with the stud 5, whereupon the sleeve 15 is pushed downwardly to encompass the stud and thereby lock the connector in applied position, substantially as described. In this relation, the detent 21 of the spring catch snaps into the recess 26 in the body 10 to maintain the sleeve in the locked position of the connector against accidental or unintended removal or displacement.

The invention has been described with reference to its use as a connector employed with tie-down fittings and the like, but it will be quite apparent that it has equal utility in other devices or applications.

It will be understood, further, that the above description and accompanying drawings comprehend only a general embodiment of the invention and that various changes in the construction, proportion, arrangement and general combination of parts may be made without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

The invention described herein may be manufactured and used by or for the Government of the United States of America for governmental purposes without the payment of any royalties thereon or therefor.

What is claimed is:

1. A connecting device for connecting an object to a stud having a laterally extending annular flange, said connecting device comprising a body adapted to be attached at one end to said object and an integral hook at the other end thereof defined by a recess adapted to receive any peripheral portion of said annular flange on the stud, and a member on said body movable axially thereof to overlap said flange in opposing relation to the hook in one position and to clear said flange in another position.

2. A connecting device for connecting an object to a stud having a laterally extending annular flange, said connecting device comprising a body adapted to be attached at one end to said object and an integral hook at the other end thereof defined by a recess adapted to receive any peripheral portion of said annular flange on the stud, and an axially movable sleeve on said body adapted to overlap said flange on the stud in opposing relation to the hook in one position and to clear said flange in another position.

3. A connecting device for connecting an object to a stud having a laterally extending annular flange, said connecting device comprising a body adapted to be attached at one end to said object and an integral hook at the other end thereof defined by a recess adapted to receive any peripheral portion of said annular flange on the stud, an axially movable sleeve on said body adapted to overlap said flange in opposing relation to the hook in one position and to clear said flange in another position, and snap fastening means associated with said body for retaining the sleeve in either of said positions.

4. A connecting device for connecting an object to a stud having a laterally extending annular flange, said connecting device comprising a body adapted to be attached at one end to said object and an integral hook at the other end thereof defined by a recess adapted to receive any peripheral portion of said annular flange on the stud, an axially movable sleeve on said body adapted to overlap said flange in opposing relation to the hook in one position and to clear said flange in another position, and a spring biased detent carried by the sleeve and engaging said body to retain the sleeve in either of said positions.

5. A connecting device for connecting an object to a stud having a lateraly extending annular flange, said connecting device comprising a body adapted to be attached at one end to said object, a bearing face at the other end thereof and an integral hook adjacent said bearing face defined by a recess adapted to receive any peripheral portion of said annular flange on the stud with said bearing face in engagement with the top of the stud, an axially movable sleeve on said body adapted to overlap said flange in opposing relation to the hook in one position and to clear said flange in another position, a spring arm attached to the sleeve and a detent carried by said spring arm for engaging said body to retain the sleeve in either of said positions.

6. The combination of a stud having a laterally extending annular flange and a device for detachably connecting an object to said stud, said device comprising a body attached at one end to said object, an integral hook at the other end of said body defined by a recess adapted to receive any peripheral portion of said annular flange on the stud, and a member on said body movable axially thereof to overlap said flange in opposing relation to the hook in one position and to clear said flange in another position.

HERMAN LOMBARD.

REFERENCES CITED

The following references are of record in the file of this patent:

UNITED STATES PATENTS

| Number | Name | Date |
| --- | --- | --- |
| 709,400 | Fitzpatrick | Sept. 16, 1902 |
| 1,815,660 | Walker | July 21, 1931 |
| 1,490,705 | Lauterbur | Apr. 15, 1924 |

FOREIGN PATENTS

| Number | Country | Date |
| --- | --- | --- |
| 308,163 | Great Britain | Mar. 21, 1929 |